Nov. 3, 1931.　　　　　G. MacLEAN　　　　　1,829,753
HEAT INTERCHANGE AND MIXING APPARATUS
Filed April 13, 1929　　　3 Sheets-Sheet 1

INVENTOR
Gordon MacLean
BY
Frank I. Cut
ATTORNEY

Patented Nov. 3, 1931

1,829,753

UNITED STATES PATENT OFFICE

GORDON MacLEAN, OF FLUSHING, NEW YORK, ASSIGNOR TO THE TURBO-MIXER CORPORATION, OF NEW YORK, N. Y., A CORPORATION OF NEW YORK

HEAT INTERCHANGE AND MIXING APPARATUS

Application filed April 13, 1929. Serial No. 354,852.

This invention relates to mixing and heat interchange apparatus, and its principal object is to increase the efficiency of heat interchange by moving the circulated material at high velocity over the heating or cooling surfaces.

To this end the invention provides as principal features, for circulating the heating or cooling medium through chambered portions of a part of the active mixing apparatus, or specifically, through hollow blades of the deflector structure of a mixer of the turbo type, so that the circulated material passes over the blade surfaces at relatively high speed, and with scouring effect, and the heat transfer is correspondingly accelerated.

For convenience in description the following definitions are adopted:

The material mixed or circulated and which is to be heated or cooled is called the "mix"; the heating or cooling material—steam, hot or cold water, brine, etc.—is called the "thermal medium" or "agent"; and the metal wall or body interposed between the thermal agent and the mix is called the "thermal body", and its outer surface the "thermal surface".

In mixing apparatus providing for heat transfer the common form is a tank with mixing or circulating apparatus therein, and having a jacket in which the thermal agent is circulated. The heat transfer through the tank wall, of copper or even less conductive metal, may be satisfactorily rapid; but the mix is moved with relatively low velocity over the inner face of this wall; and since the rate of heat transfer between the mix and the thermal body is a function of the rate of movement, the rate of effective heat transfer is relatively low. To give a single definite example, in chilling ice cream mixtures, not only does the mix move slowly at the thermal surface, but there is a tendency to form a fixed coating thereon which acts as an insulator so that the effective heat transfer, even with a copper tank providing high conductivity in the thermal body, is at a lower rate than if the tank wall were of iron or other metal having lower heat conductivity than copper and the mix circulated more rapidly over the thermal surface, or accumulation of an insulating coating avoided.

The invention aims to overcome the stated difficulties or disadvantages by producing the effective heat interchange at areas or locations where the mix moves at high velocity and the rate of heat exchange is greatly increased by that reason, and also the thermal surface is kept relatively clean, and accumulation of an insulating coating is largely or entirely avoided by the scouring effect of the high velocity of the mix moving over such surface.

I therefore provide means for circulating the thermal agent through an active part of the mixer proper—specifically as shown, through the blades of a stationary deflector forming a part of a mixer of the turbo type, and the mix is propelled at high speed over the blade surfaces with the increased efficiency of heat transfer above noted.

The characteristics and advantages of the invention are further sufficiently explained in connection with the following detail description of the accompanying drawings, which show certain representative embodiments. After considering these examples, skilled persons will understand that many variations may be made without departing from the principles disclosed, and I contemplate the employment of any structures that are properly within the scope of the appended claims.

Figure 1:
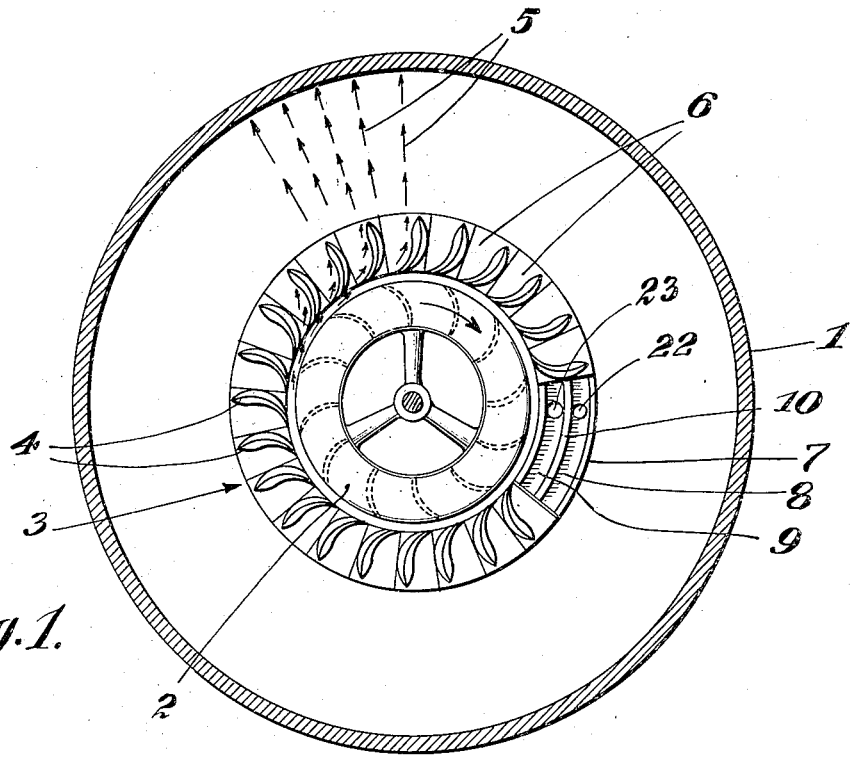
Fig. 1 is a horizontal section of a typical cylindrical tank with a mixer of the turbo type located in the lower portion thereof and embodying the invention in one form.
Figure 2:
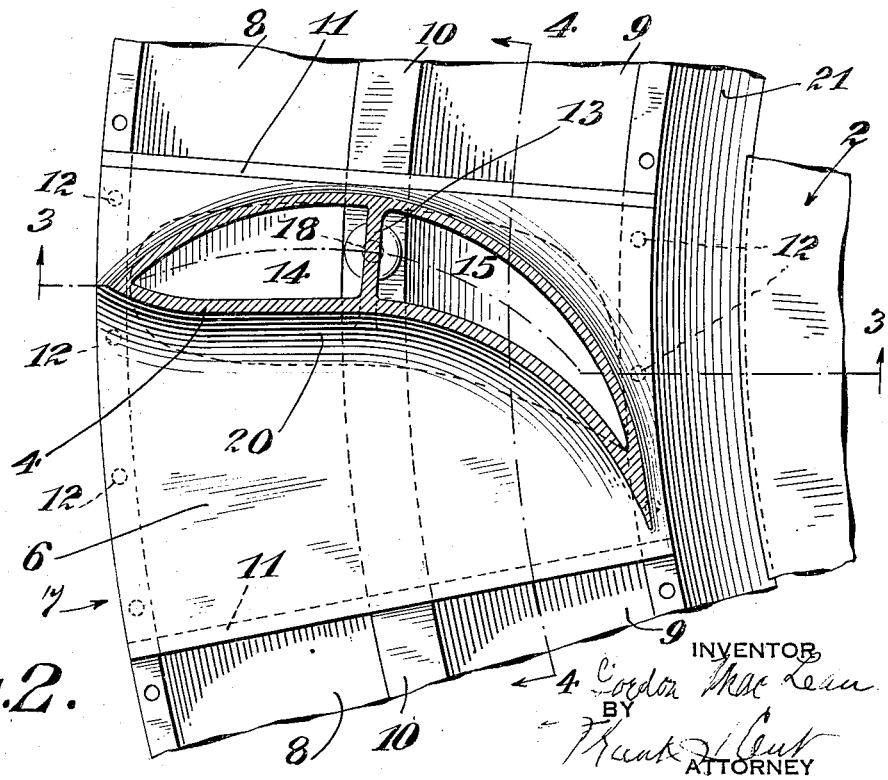
Fig. 2 is a horizontal section of a segment of the deflector structure.
Figure 3:
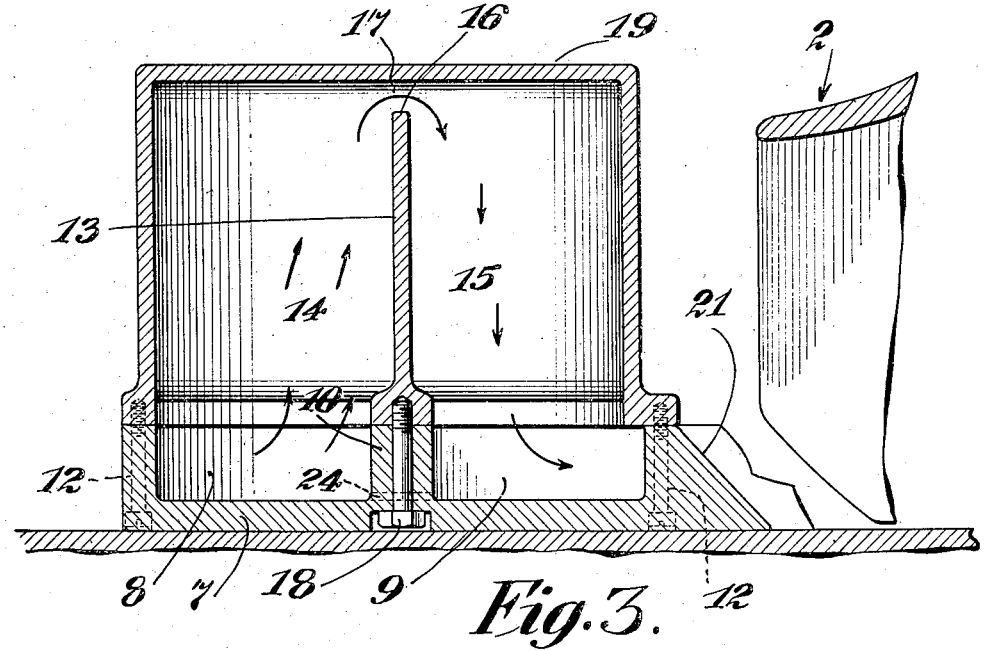
Fig. 3 is a section at 3—3, Fig. 2.

In Fig. 1, 1 is a cylindrical tank having a turbo-type mixer located at its bottom. The mixer includes a rotary bladed impeller 2 of known type surrounded by a stationary deflector 3 having blades 4 arranged to receive material discharged tangentially by the impeller and convert the flow to a radial flow toward the tank wall, as indicated by arrows 5. The deflector is also of known type except for modifications for present purposes, as now explained:

To provide the desired circulation of thermal medium through them the blades 4 are hollow, and as an incident to the hollow construction for the principal purpose of circulating the thermal agent, the blades may at the same time be thicker throughout the greater portion of their length (in the direction of flow of the mix) than has heretofore been customary. This makes it possible to provide blades of modified stream-line form whereby the proper flow of the mix is facilitated. Thus, as shown, the deflector blades are in horizontal section of true or approximate stream-line forms corresponding substantially to sections of airplane airfoils.

Referring first to the specific form shown in Figs. 1 to 4: The blades 4 are formed as parts or extensions of an upper annular plate or ring or of segments 6 of such a ring, and cooperate with a lower annular plate or ring 7 to form the complete deflector structure. The lower ring or plate rests on and is secured in any suitable way to the tank bottom and has its upper portion hollowed or chambered. Specifically as shown in Figs. 1 to 4, there are two annular channels or chambers 8 and 9 separated by a center wall 10. The plate segments 6, each of which may carry one or more of the blades 4, may have their meeting ends interfitted or connected in any suitable way, as by tongue and groove formations 11. They are secured to the base ring as by screws 12 passing through inner and outer wall portions of the base ring and engaging in inner and outer edge portions of the plates 6. Each blade has at an intermediate or central location (lengthwise in the direction of mix flow), a baffle or partition 13, dividing the blade interior into outer and inner chambers 14 and 15. The baffle terminates at 16 below the top of the blade, thus providing a port or passage 17 affording communication between the blade chambers. The bottom of the partition corresponds with the top of partition wall 10 of the lower ring, and a screw 18 may be inserted through the partition wall and engaging in the base of the blade partition 13 to aid in securing the blade segment to the lower ring. The top of blade 4 is preferably rounded off as at 19, and the bases of the blade walls are joined to plate 6 by filleted or curved formations 20 to avoid sharp corners and insure smooth and rapid flow of the mix at the bases as well as along the main areas of the blades. The inner wall of the lower ring is beveled as at 21 to provide smooth deflection of the mix from the impeller to the bases of the blades.

The thermal medium may be supplied to the outer annular chamber 8 and discharged from the inner chamber 9 through ports 22 and 23 respectively, through the tank bottom and lower wall of the lower ring. The flow direction may in some cases be reversed, but especially in the case of steam the flow is preferably from the outside to the inside on account of condensation—contraction and the smaller area of the inner annular chamber and connected passages compared to that of the outer chamber and passages. In order to allow the use of steam and prevent trapping condensation water, bleeder passages 24 may be provided in the base or partition wall 10 at suitable intervals, and such small passages will not materially affect the proper circulation of other mediums, such as brine or water.

In operation, the thermal medium passes from the outer chamber 8 of the lower ring into the outer chambers 14 of the blades and then through the blade ports 17 to the inner chambers 15 and so on to the inner chamber 9 of the lower ring and then out through the discharge port 23. The impeller 2 circulates the mix rapidly between the deflector blades and over their anterior and posterior surfaces, and by reason of the rapid movement of the mix over the thermal bodies (walls of the blades) accumulation of an insulating layer is prevented and the heat transfer to or from the mix is greatly amplified or expedited in comparison with the relatively slower or sluggish circulation adjacent the wall in a jacketed tank, the formation of an insulating layer thereon and other objectionable features above referred to. At the same time the blades divert the tangential flow of the mix to radial flow and by reason of their modified stream-line form, resistance to flow is reduced; also effective contact is maintained with the posterior faces of the blades by a substantial part of the mix, whereas with ordinary solid blades of thin section a true stream-line form is impossible.

The thermal medium flow arrangement just described may be called a "parallel" arrangement since the thermal medium moves from the outer to the inner chamber of the lower ring through all of the blades simultaneously. The lower ring may be divided, that is, it may consist of two or more part-circular segments, and flow may be conducted through each of the segments in an analogous manner. Otherwise, a series flow arrangement may be provided as later referred to.

Figures 4, 6:
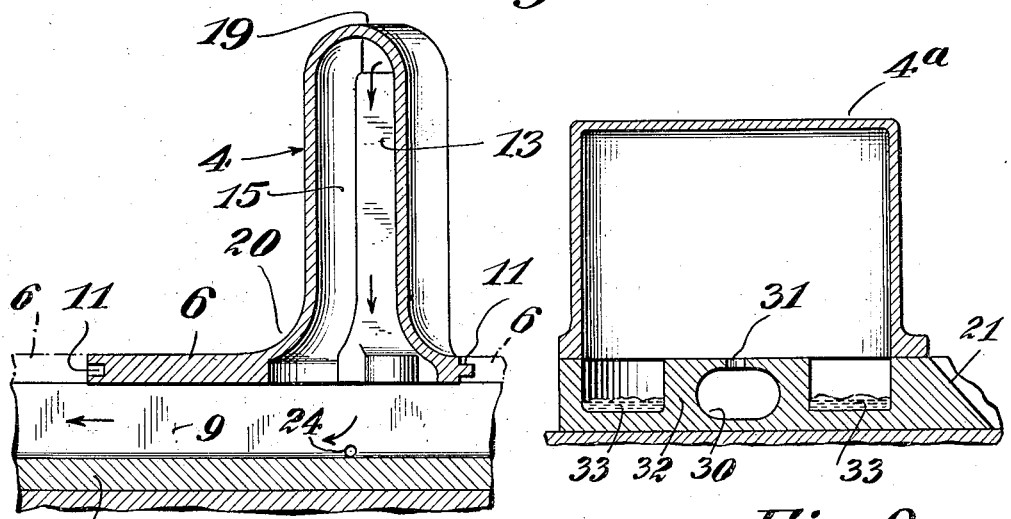
Fig. 4 is a section at 4—4, Fig. 2.
Fig. 6 is a view similar to Fig. 3 but showing a modified structure.

Fig. 6 shows a modification intended especially for the use of steam, in which the blades 4ᵃ need not have any baffle plates or partitions. Steam may be introduced into the lower ring or into an annular conduit or passage 30 therein and discharged into the lower part of each blade through a jet or port 31. The central annular wall 32 containing the steam passage 30 produces in the lower ring annular channels or conduits 33 for water of condensation which is drained off at any suitable point or points through discharge ports and connection.

Figure 5:
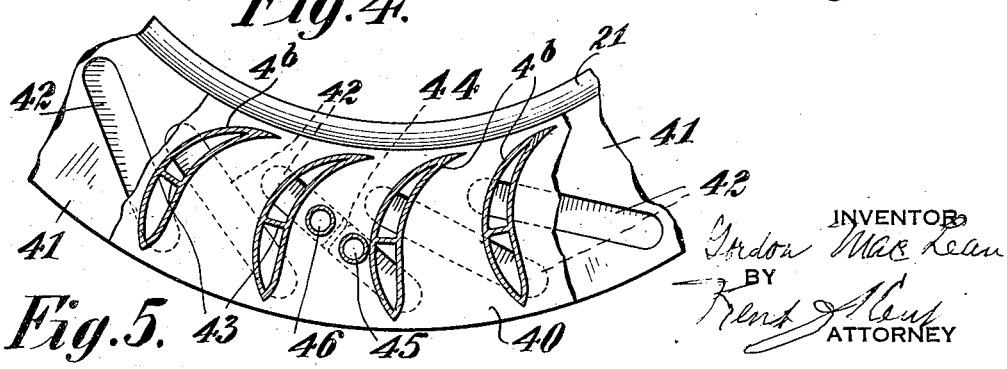
Fig. 5 is a section similar to Fig. 2, showing a modified structure or arrangement.

In Fig. 5 the blades 4ᵇ are formed on an upper (continuous or segmental) ring, or annular plate 40, secured to a lower plate or ring 41 which has in its upper surface diagonal channels 42. The blades have transverse partitions 43, as in the previous example. One (or more) of the channels may be divided by a partition 44, and an inlet port 45 provided in one part of the channel, and an outlet port 46 in the other port. The thermal medium entering at 45 goes into the outer chamber of the corresponding blade, up over the top of its partition to the inner blade chamber, and then through the next channel 42 to the next blade, and so on, being finally discharged through port 46. This is one example of "series" circulation of the thermal medium.

Figure 7:
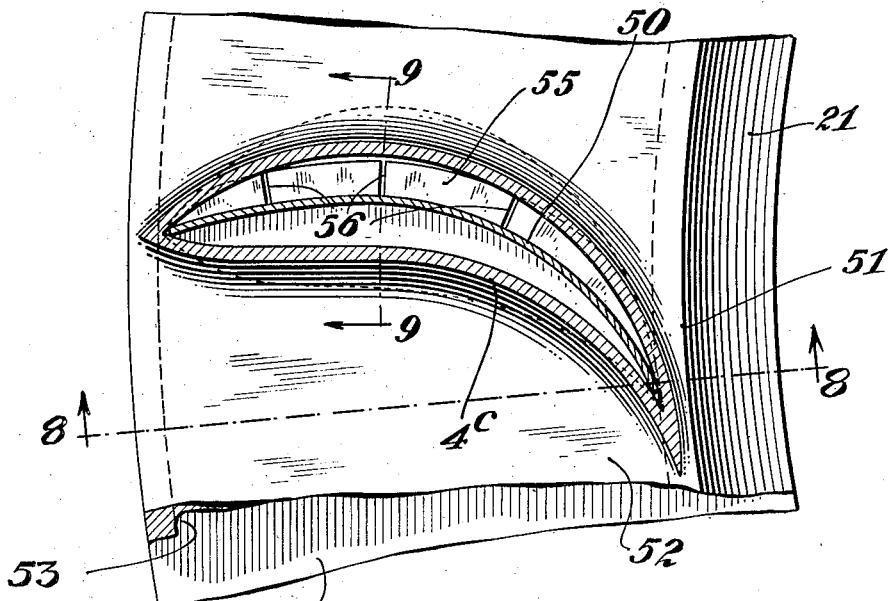
Fig. 7 is a view similar to Fig. 2 showing another modification.
Figures 8, 9:
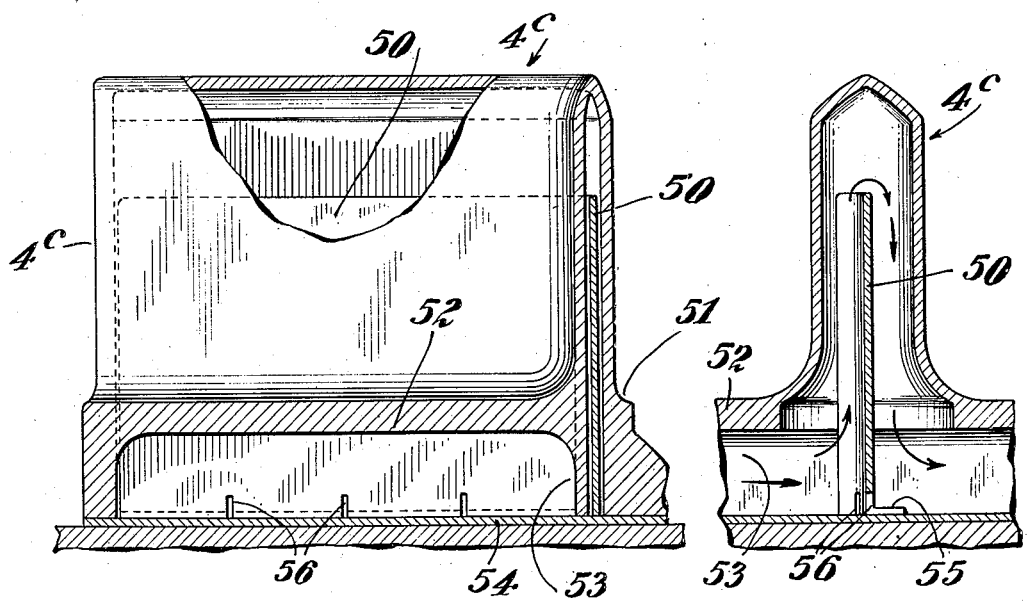
Fig. 8 is a section at 8—8, Fig. 7.
Fig. 9 is a section at 9—9, Fig. 7.

Figs. 7 to 9 show another arrangement for series flow of the thermal medium. The blades 4ᶜ have longitudinal partitions 50. The blades are in this case formed as parts of a main annular structure 51 having a horizontal wall 52 at the blades bases and arranged to provide an annular chamber 53 below this wall. The chamber is closed by a plate 54 which may be welded to the inner and outer walls of the chamber. The partitions 50 may be formed on or secured to this lower plate 54 and thus serve to divert the thermal medium flowing through the lower chamber 53 up into the anterior space of each blade and then down through the posterior space or chamber of the blade and so on through the continuous chamber or passage 53, as indicated by arrows in Fig. 9, thus providing for series flow of the medium through the successive blades. The medium may be supplied to the continuous passage 53 at one or more points and discharged at one or more points, as desired. As shown, the partitions have base-flanges 55, and bleeder slots 56 are cut through the lower parts of the partition walls and through the base flanges, for passage of condensation-water. Flanges 55 may be secured to plate 54 by welding, rivets, or otherwise.

Statements of position herein are, broadly, only relative, and without limiting significance. Thus, the plates or rings may be above the blades, which may depend therefrom; the mixing apparatus, including the deflector, may be in an intermediate or upper position in the tank; the hollow blades may in some cases be located between upper and lower plates or rings, and thermal circulation may be from passages or channels in one ring, to passages in the other, through the blades. Other variations or modifications within the scope of the invention will be apparent to skilled persons.

I claim:

1. In mixing and heat exchange apparatus, a mixer having hollow mix-deflecting blades and means for supplying thermal medium to the interior of the blades, the blades having interior partitions to direct thermal medium through the blades.

2. In apparatus of the class referred to, an impeller and a bladed deflector including hollow blades, the deflector structure also including passages arranged to supply thermal medium to portions of the blades and receive the medium from other portions thereof, the blades having interior partitions.

3. In apparatus of the class referred to, an impeller and a bladed deflector including hollow blades, the deflector structure also including passages arranged to supply thermal medium to portions of the blades and receive the medium from other portions thereof, the blades having interior transverse partitions.

4. In apparatus of the class referred to, an impeller and a bladed deflector, the deflector including a base portion having a thermal passage and an upper portion secured to the base portion and having one or more hollow blade formations.

5. In apparatus of the class referred to, an impeller and a bladed deflector, the deflector including a base portion having a thermal passage and an upper portion secured to the base portion and having one or more hollow blade formations, and interior partitions in the blades.

6. In apparatus of the class referred to, an impeller and a bladed deflector, the deflector including a base portion having a thermal passage and an upper portion secured to the base portion and having one or more hollow blade formations, and interior transverse partitions in the blades.

7. In apparatus of the class referred to, an impeller and a bladed deflector, the deflector including a base portion having a thermal passage, and upper segmental portions secured to the base portion and each having one or more hollow blade formations.

8. In apparatus of the class referred to, an impeller and a bladed deflector, the deflector including a base portion having a thermal passage, and upper segmental portions secured to the base portion and each having one or more hollow blade formations, and interior partitions in the blades.

9. Mixing and heat interchange apparatus comprising a tank, and therein mixing apparatus including a rotary impeller and a stationary deflector having a plurality of hollow deflecting blades located in the path of material discharged from the impeller, the blades having interior partitions directing flow of a thermal medium, and means for supplying a thermal medium to each blade at one side of its partition and for discharging the medium at the other side thereof.

10. Mixing and heat interchange apparatus comprising a tank and therein mixing apparatus including a rotary turbo-impeller and a stationary deflector about the impeller, having a plurality of stream-lined, hollow deflecting blades substantially tangentially located in the path of material discharged from the impeller, and means for supplying a thermal medium to the blades.

11. Mixing and heat interchange apparatus comprising a tank and therein mixing apparatus including a rotary turbo-impeller and a stationary deflector about the impeller, having a plurality of stream-lined, hollow deflecting blades substantially tangentially located in the path of material discharged from the impeller, the blades having interior partitions directing flow of a thermal medium, and means for supplying a thermal medium to each blade at one side of its partition and for discharging the medium at the other side thereof.

12. Mixing and heat interchange apparatus comprising a tank; a rotary impeller having a series of annularly disposed blades operative to receive the mix centrally and discharge it centrifugally; an annularly disposed series of deflector blades surrounding the impeller blades and operative to deflect the mix as it is discharged by the impeller, at least some of said deflector blades being hollow; and means to supply a thermal medium to said hollow deflector blades.

13. Mixing and heat interchange apparatus comprising a tank; a rotary impeller having a series of annularly disposed blades operative to receive the mix centrally and discharge it centrifugally; an annularly disposed series of elongated stream lined deflector blades surrounding the impeller blades and operative to deflect the mix as it is discharged by the impeller, at least some of said stream lined blades being hollow, and being positioned to deflect the flow from the impeller without producing turbulence; and means to supply a thermal medium to said hollow deflector blades.

14. Mixing and heat interchange apparatus comprising a tank; a rotary impeller having a series of annularly disposed blades operative to receive the mix centrally and discharge it centrifugally; an annularly disposed series of deflector blades surrounding the impeller blades and operative to deflect the mix as it is discharged by the impeller, at least some of said deflector blades being hollow; and means to supply a thermal medium to said hollow deflector blades with parallel flow of the thermal medium through the hollow blades.

In testimony whereof I affix my signature.
GORDON MacLEAN.